Sept. 30, 1930.  J. L. LOONEY  1,777,005
ABSORBENT OIL TREATER
Filed Aug. 13, 1928
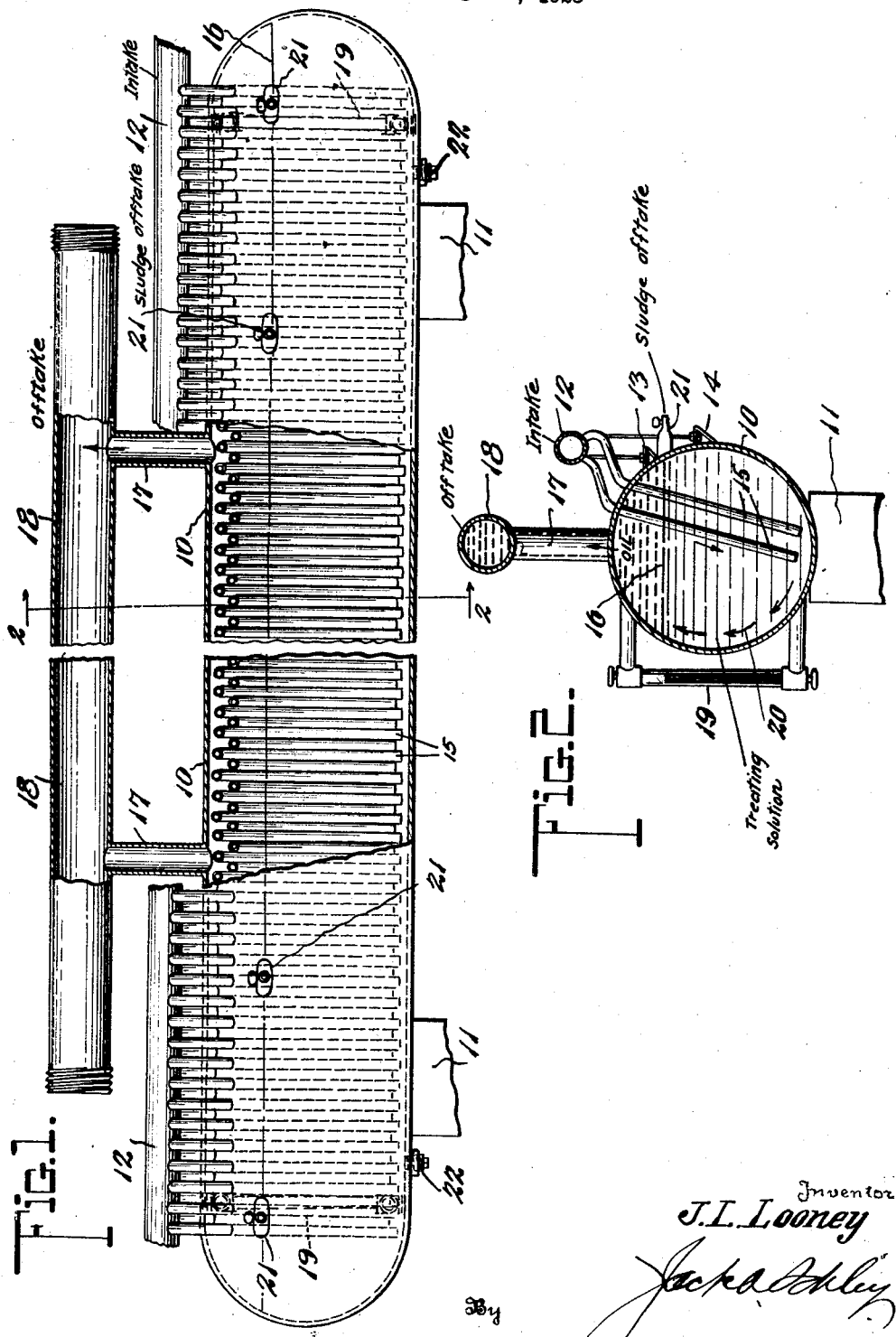

Patented Sept. 30, 1930

1,777,005

UNITED STATES PATENT OFFICE

JOHN L. LOONEY, OF WINFIELD, KANSAS

ABSORBENT OIL TREATER

Application filed August 13, 1928. Serial No. 299,284.

This invention relates to an absorbent oil treater, and particularly to a construction wherein the oil is passed by gravity through a chemical solution by which the sulphur and other solid matter carried thereby is collected as sludge and the clarified oil flowed to a point for further use.

The invention is applicable for the treatment of various characters of oils, but is particularly designed for use with the heavy absorbent oil used in casing head gasoline plants where the gas coming from the oil well carries a percentage of sulphur which causes a breakdown of the absorbent oil in the absorption of the gasoline from the gas. When such oil releases the gasoline in a preheater the sulphur and solid matter is deposited upon the heated surface thereof and can only be removed by opening the preheater and drilling out the collected solids. To avoid such objections it is desirable to remove from the absorbent oil the sulphur collected from the well gas before the oil reaches the distillation unit and thus prevent clogging or corrosion thereof.

To most successfully accomplish this clarification it is important to avoid a forced circulation of the oil and to slowly feed the same by a plurality of tubes from an intake manifold into the lower portion of a tank carrying a chemical solution through which the oil rises by gravity and the resulting sludge is deposited at the top of the solution while the oil rises into the discharge manifold which is of greater capacity than the intake manifold in order to effect a retarded movement to permit precipitation therefrom of solid matters. The collection and discharge of the sludge is facilitated by disposing the intake tubes at an angle to the vertical which causes the rising oil to follow one side of the tank and collects the sludge at the surface of the solution where the discharge cocks are located at the opposite side of the tank.

The invention has for an object to provide an improved oil treating apparatus including a horizontally disposed elongated receptacle adapted to contain a chemical solution into which the oil is introduced at the lower portion of the receptacle by a plurality of tubes from an intake manifold, together with a discharge manifold communicating with the receptacle throughout its length.

A further object of the invention is to present a new structure for treating oil comprising a horizontally disposed elongated tank, a parallel intake manifold having a series of small tubes discharging at the lower portion of the tank, and a parallel discharge manifold having a series of pipes communicating with the upper portion of the tank.

Another object of the invention is to provide for the passage of the oil through a chemical solution by gravity by feeding the oil at the lower portion of the tank from a series of small tubes discharging at an angle to the vertical axis of the tank to direct the oil toward one side thereof, and the provision of sludge discharge cocks at the opposite side of the tank substantially at the level of the chemical solution therein.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a side elevation of the device with parts in section, and

Fig. 2 is a section on the line 2—2 of Fig. 1.

Like numerals refer to similar parts in the figures of the drawing.

The invention is adapted for application by different forms of apparatus, and in the construction shown, as an example, the tank or receptacle 10 is horizontally disposed and of material length. Such a tank may be of any desired capacity and is supported upon a suitable base 11, for instance I may use a tank of 20 inch diameter and 18 feet in length.

The oil is fed to the lower portion of this tank from a longitudinally extending header 12 supported parallel to one side of the tank by brackets 13 and 14 mounted thereon. From this header a series of feed tubes 15 extend downward through the tank and terminate adjacent the bottom thereof with their discharge openings disposed at an angle to the vertical axis of the tank to cause the oil to rise at the side 20 of the tank, which results in the sludge passing to the opposite side of the tank at which point a series of flattened discharge cocks 21 are located at the solution level within the tank. The collected sludge may be thus removed without material loss of either the oil or solution.

The tubes 15 are greatly reduced in diameter relative to the intake manifold and their capacity equals that of the manifold so that the oil enters quietly and without resistance to the lower portion of the tank and then rises by gravity to the level 16 of the chemical solution upon which it rests until discharged. As an example of the relative capacity of the manifold and tubes, the former may be 4 inches in diameter and the tubes one quarter of an inch in diameter which breaks up the oil into small globules at the bottom of the tank and facilitates the subsequent reaction of the solution thereon.

The oil in discharging from the tank rises through the pipes 17 into the header 18 which is of greater area or capacity than the inlet header, for instance 6 inches in diameter, and causes the oil to be slowly discharged without agitation so that the treating chemicals will precipitate to the surface of the solution and not be carried forward with the oil, as in the case of a forced circulation. The tank is provided with a gage glass 19 connected at the top and bottom thereof so as to indicate both the oil and solution level within the tank. It may also be formed with suitable openings 22 by which it is charged with solution or the latter drained therefrom. The character of this solution may be varied contingent upon the oil to be treated and the impurities to be removed therefrom, but a desirable solution for the collection of sulphur and solid matter consists of caustic soda or sodium hydroxide diluted with one eighth of a pound of litharge for each gallon of solution which provides a specific gravity of from 14 to 16.

The operation of the invention will be understood from the foregoing description and it will be seen that as the tubes equal the area of the intake manifold the oil enters without resistance at the bottom of the solution and rises therethrough by gravity coming to rest upon the surface of the solution. This slow movement without agitation prevents mulching or emulsifying of the oil with the solution, while the discharge through the enlarged manifold retards the oil movement to prevent carrying over of any of the solution. The construction avoids the use of pumps or agitating means rendering it economical to construct and operate and more efficient in such operation.

While the specific construction of the several parts has been shown and described the invention is not confined thereto as changes and alteration may be made therein without departing from the spirit of the invention as recited in the following claims.

What I claim, is:

1. In an oil treating apparatus, a horizontally disposed elongated receptacle adapted to contain a chemical solution, an intake manifold therefor, a plurality of conduits connecting said manifold with the lower portion of the receptacle, a discharge manifold communicating with the upper portion of the receptacle, and a plurality of normally closed sludge discharge means disposed intermediate the top and bottom of the receptacle.

2. In an oil treating apparatus, a horizontally disposed elongated tank adapted to contain a chemical solution, a liquid intake manifold supported above the base of the tank at one side thereof, a series of tubes of reduced diameter extending from the manifold to the lower portion of the tank throughout the length thereof, a discharge manifold of greater diameter than the intake manifold and having vertical pipes communicating with the upper portion of the tank and sludge outlets intermediate the top and bottom of the tank.

3. In an oil treating apparatus, a horizontally disposed elongated tank adapted to contain a chemical solution, an intake manifold supported above the base of the tank at one side thereof, a series of tubes of reduced diameter extending from the manifold to the lower portion of the tank throughout the length thereof, a discharge manifold of greater diameter than the intake manifold and having vertical pipes communicating with the upper portion of the tank, and sludge discharge cocks disposed at one side of the tank to withdraw material from the surface of said solution.

4. In an oil treating apparatus, a horizontally disposed tank adapted to contain a chemical solution, an intake manifold at one side thereof, a series of reduced feed tubes extending from the manifold downward through the tank at an angle to the vertical axis thereof and discharging only toward one side of the tank to effect an upward flow at that point, a discharge manifold connected with the upper portion of the tank to receive a liquid flow therefrom, and sludge discharge means at the side of the tank opposite said flow.

5. In an oil treating apparatus, a horizontally disposed tank adapted to contain a chemical solution, an intake manifold at one side thereof, a series of reduced feed tubes extending from the manifold downward through the tank at an angle to the vertical axis thereof and discharging to create an upward flow at one side of the tank, a discharge manifold connected with the upper portion of the tank, and sludge discharge cocks at the side of the tank opposite said flow.

6. In an oil treating apparatus, a horizontally disposed tank adapted to contain a chemical solution, a liquid intake manifold supported above the tank, a series of tubes of reduced diameter extending from the manifold to feed by gravity to the lower portion of the tank throughout its length, a discharge manifold communicating with the upper portion of the tank, and a normally closed sludge discharge outlet intermediate the top and bottom of the tank.

In testimony whereof I affix my signature.

JOHN L. LOONEY.